(12) United States Patent
Hideshima et al.

(10) Patent No.: US 9,170,396 B2
(45) Date of Patent: Oct. 27, 2015

(54) IMAGING LENS BARREL

(71) Applicant: FUJIFILM Corporation, Tokyo (JP)

(72) Inventors: Masahiro Hideshima, Saitama (JP); Tsuyoshi Mitarai, Saitama (JP); Atsushi Misawa, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/565,529

(22) Filed: Dec. 10, 2014

(65) Prior Publication Data
US 2015/0092283 A1 Apr. 2, 2015

Related U.S. Application Data

(63) Continuation of application No. PCT/JP2013/071029, filed on Aug. 2, 2013.

(30) Foreign Application Priority Data

Aug. 22, 2012 (JP) .................................. 2012-183399

(51) Int. Cl.
G02B 15/14 (2006.01)
G02B 7/02 (2006.01)
(Continued)

(52) U.S. Cl.
CPC .. *G02B 7/10* (2013.01); *G02B 7/04* (2013.01); *G03B 3/10* (2013.01); *G03B 13/32* (2013.01); *G03B 2205/0046* (2013.01)

(58) Field of Classification Search
CPC ........ G02B 7/10; G02B 7/021; G02B 23/125; G02B 7/02; G02B 7/023; G02B 7/04; G02B 7/026; G11B 7/0932; G03B 17/14

USPC ......... 359/701, 699, 700, 703–704, 811, 813, 359/815, 819, 822–823, 826–827, 829–830
See application file for complete search history.

(56) References Cited

U.S. PATENT DOCUMENTS 5,708,872 A 1/1998 Fukino
6,002,886 A 12/1999 Tamura
(Continued)

FOREIGN PATENT DOCUMENTS

JP 60-82610 6/1985
JP 06-160690 6/1994
(Continued)

OTHER PUBLICATIONS

International Search Report PCT/JP2013/071029 dated Nov. 5, 2013.
(Continued)

*Primary Examiner* — Dawayne A Pinkney
(74) *Attorney, Agent, or Firm* — Young & Thompson

(57) ABSTRACT

An appropriate operation angle (actuation angle) corresponding to a use is obtained by a relatively simple structure.
A focus ring 20 is mounted around a focus cam 10. When the focus ring 20 is moved to a front end side, a gear formed in the focus ring 20 meshes with a gear 17 of the focus cam 10 and the rotation of the focus ring 20 is directly transmitted to the focus cam 10. When the focus ring 20 is moved to a rear end side, the gear formed in the focus ring 20 meshes with pinions 15 mounted on the focus cam 10 and the rotation of the focus ring 20 is directly transmitted to the focus cam 10 through the pinions 15. A half of the rotation angle of the focus ring 20 is the same as the rotation angle of the focus cam 10.

4 Claims, 9 Drawing Sheets

(51) Int. Cl.
    *G02B 7/10*     (2006.01)
    *G02B 7/04*     (2006.01)
    *G03B 3/10*     (2006.01)
    *G03B 13/32*     (2006.01)

(56) References Cited

U.S. PATENT DOCUMENTS 7,744,227 B2 * 6/2010 Shindo et al. ............... 353/101
2008/0273252 A1 * 11/2008 Shimizu ...................... 359/699

FOREIGN PATENT DOCUMENTS

| JP | 08-114739 | 5/1996 |
| JP | 2002-365513 | 12/2002 |
| JP | 2004-045685 | 2/2004 |

OTHER PUBLICATIONS

Written Opinion of the International Searching Authority PCT/JP2013/071029 dated Nov. 5, 2013.

* cited by examiner

IMAGING LENS BARREL

CROSS-REFERENCE TO RELATED APPLICATIONS

This application is a Continuation of PCT International Application No. PCT/JP2013/071029 filed on Aug. 2, 2013, which claims priority under 35 U.S.C §119(a) to Japanese Patent Application No. 2012-183399 filed on Aug. 22, 2012. Each of the above applications is hereby expressly incorporated by reference, in its entirety, into the present application.

BACKGROUND OF THE INVENTION

1. Field of the Invention

The present invention relates to an imaging lens barrel.

2. Description of the Related Art

A focus lens, a zoom lens, and the like are built in an imaging lens barrel. A rotatable operation ring is provided on the outer periphery of the imaging lens barrel, and the focus lens, a zoom lens, and the like are moved in a direction of an optical axis by the rotation of the operation ring.

Examples of this imaging lens barrel include a lens barrel that is set to a precise adjustment mode when a focus ring is moved forward along an optical axis and can be set to a quick adjustment mode when the focus ring is moved backward along the optical axis (JP2002-365513A), a lens barrel that allows manual focusing to be performed by fine adjustment (JP1996-114739A (JP-H08-114739A)), and a lens barrel that performs a rough movement focusing operation and a fine movement focusing operation by using two rings, that is, a rough movement ring and a tine movement ring (JP1985-82610U (JP-S60-82610U)).

SUMMARY OF THE INVENTION

However, an optimum operation angle of an operation ring may vary according to the conditions of uses, such as the use of an imaging, lens barrel to make a movie and the use of an imaging lens barrel to take pictures for reports. For example, when a movie is made, a focus operation having a large operation angle, for example, 300°, is required. However, when pictures for reports are taken, a focus operation ring having a relatively small operation angle, for example, about 120°, is required so that an operation angle can be easily adjusted by one-hand operation. In JP2002-365513A, the precise adjustment mode and the quick adjustment mode can be switched but the lens barrel has a very complicated structure. Further, the lens barrel has a complicated structure likewise even in JP1996-114739A (JP-H08-114739A) and JP1985-82610U (JP-S60-82610U).

An object of the invention is to provide an imaging lens barrel that has a simple structure without a complicated structure and obtains an appropriate operation angle (actuation angle) corresponding to a use.

An imaging lens barrel according to the invention includes: a barrel where an optical element (an imaging lens, such as a focus lens or a zoom lens, or an iris) is held and a barrel gear is formed along a peripheral surface toward the other end portion at one end portion in a direction of an optical axis; a cylindrical cam ring which is rotatable along an outer peripheral surface of the barrel, adjusts the optical element held in the barrel by rotating, and is provided with a rotatable gear including a shaft provided parallel to a radial direction at one end portion in the direction of the optical axis and meshing with the barrel gear formed on the barrel, and in which a cam gear facing one end portion is formed along a circumferential direction at the other end portion in the direction of the optical axis; and a cylindrical operation ring that is rotatable along an outer peripheral surface of the cam ring and is movable in the direction of the optical axis and in which a first operation ring gear meshing with the gear of the cam ring is formed at one end portion in the direction of the optical axis and a second operation ring gear meshing with the cam gear of the cam ring is formed at the other end portion in the direction of the optical axis.

According to the invention, the cam ring is rotatably mounted on the outer peripheral surface of the barrel. The gear, which includes the shaft provided parallel to the radial direction, is rotatably mounted on one end portion of the cam ring. When a force is transmitted to the gear, the force is transmitted to the cam ring. Accordingly, the cam ring is rotated about the optical axis. The cam gear is formed along the circumferential direction at the other end portion of the cam ring. The operation ring, which is movable in the direction of the optical axis, is mounted between the gear and the cam gear that are formed on the cam ring. The first operation ring gear and the second operation ring gear are formed at one end portion and the other end portion of the operation ring. When the operation ring is moved to one end portion, the first operation ring gear meshes with the gear of the cam ring. Accordingly, when the operation ring is rotated, the cam ring is rotated.

When the operation ring is moved to the other end portion, the second operation ring gear meshes with the cam gear of the cam ring. Accordingly, the rotation angle of the operation ring is transmitted to the cam ring without change. In contrast, when the operation ring is moved to the other end portion, the number of rotations of the operation ring is reduced by the gear. Accordingly, the rotation angle of the cam ring becomes smaller than the rotation angle of the operation ring. When the operation ring is operated, the rotation angle of the cam ring is changed even though the rotation angle of the operation ring is the same. That is, even though the actuation angle of the operation ring is different, the actuation angle of the cam ring can be changed.

The gear of the cam ring may be a gear group that is formed of a combination of a plurality of gears of which the number is an odd number. In this case, it is preferable that the gear group include a first gear that meshes with the operation ring gears of the operation ring, a second gear that meshes with the barrel gear of the barrel, and third gears that are formed of one or a plurality of gears of which the number is an odd number and which change a speed ratio between the first and second gears and mesh with the first and second gears.

The barrel gear formed on the barrel may be formed at the other end portion of a cylindrical fixing member, which is fixed to an outer peripheral surface of one end portion of a barrel fixing frame, in the direction of the optical axis.

According to the invention, an imaging lens barrel, which has a simple structure without a complicated structure and obtains an appropriate operation angle (actuation angle) corresponding to a use, is obtained.

DESCRIPTION OF THE PREFERRED EMBODIMENTS

Figure 1:
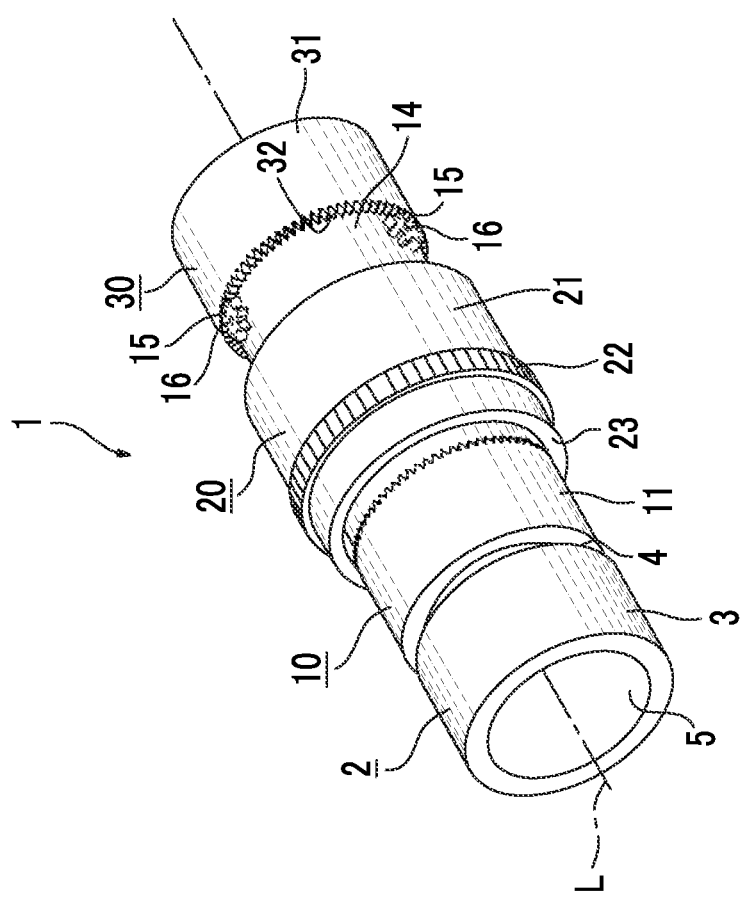
FIG. 1 is a perspective view of an imaging lens barrel.
Figure 2:
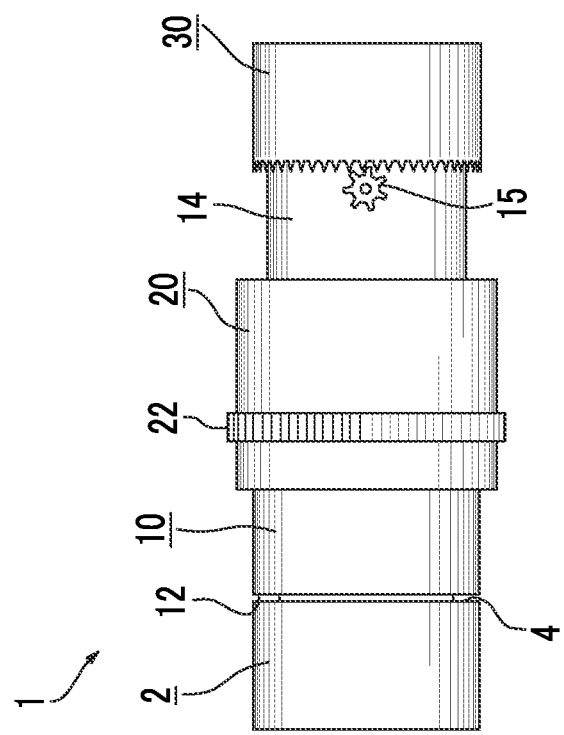
FIG. 2 is a plan view of the imaging lens barrel.
Figure 3:
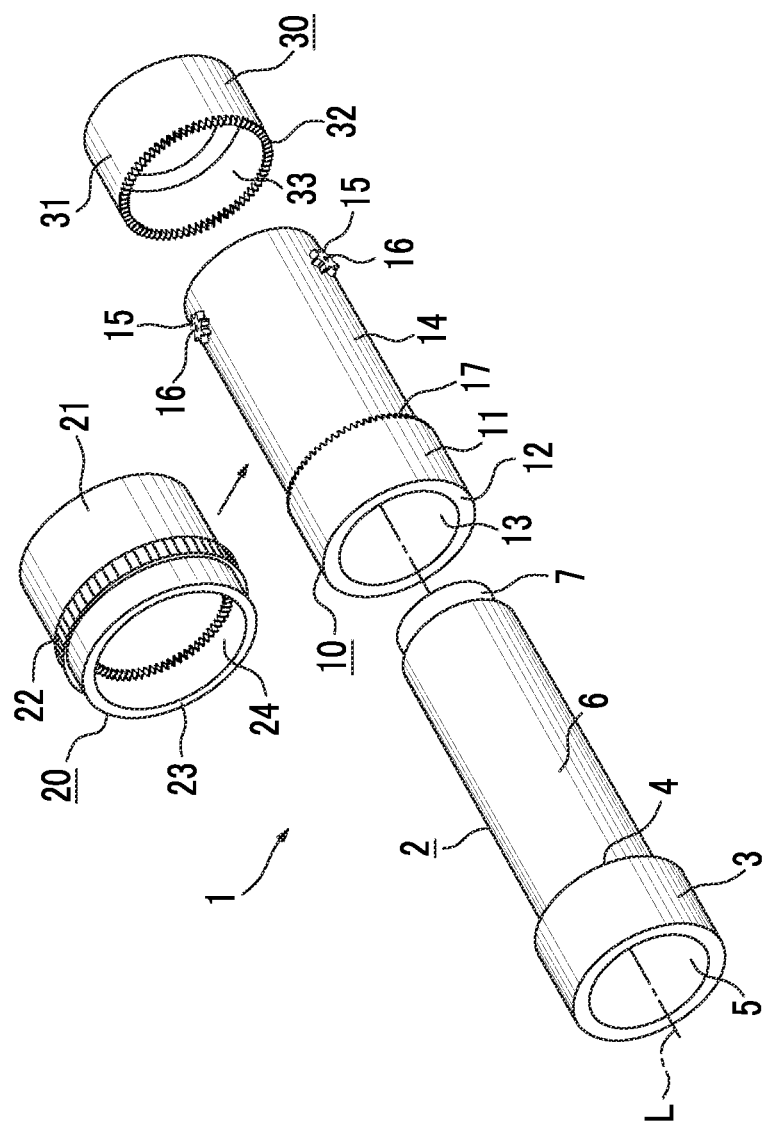
FIG. 3 is an exploded perspective view of the imaging lens barrel.

FIG. 1 is a perspective view of an imaging lens barrel 1, FIG. 2 is a plan view of the imaging lens barrel 1, and FIG. 3 is an exploded perspective view of the imaging lens barrel 1.

The imaging lens barrel 1 includes a cylindrical barrel body 2. A hollow portion 5 is formed in the barrel body 2, and a focus lens, a zoom lens (all of them are not shown), and the like are held in the barrel body 2 so as to be movable in a direction of the optical axis. Mainly referring to FIG. 3, a stepped portion 5, of which the outer diameter is increased outward in comparison with other portions, is formed at a front end portion (the other end portion) of the barrel body 2. A cylindrical outer peripheral surface 6 is formed on a middle portion of the barrel body 2. A stepped portion 7 of which the outer diameter is smaller than the outer diameter of the outer peripheral surface 6 is formed at a rear end portion (one end portion) of the barrel body 2.

Further, the imaging lens barrel 1 also includes a cylindrical focus cam 10. A hollow portion 13 is also formed in the focus cam 10. The inner diameter of the hollow portion 13 of the focus cam 10 is substantially the same as the outer diameter of the outer peripheral surface 6 of the barrel body 2, and is a size that allows the outer peripheral surface 6 of the barrel body 2 to pass through the inside of the focus cam 10. A stepped portion 11 of which the outer diameter is also increased outward in comparison with other portions is formed at a front end portion of the focus cam 10. A gear (cam gear) 17 is formed along a circumferential direction on the rear end side of the stepped portion 11. An outer peripheral surface 14 of which the outer diameter is smaller than the outer diameter of the stepped portion 11 is formed on the rear end side of the stepped portion 11. Three pinions 15 are provided on a rear end portion of the focus cam 10 at an interval of 120° in the circumferential direction (two or four or more pinions may be provided). Shafts 16 of the pinions 15 are rotatably mounted on the focus cam 10 so that extensions of the shafts 16 are directed to an optical axis L.

The imaging lens barrel 1 also includes a focus ring 20. The focus ring 20 is formed in the shape of a circular pipe. A hollow portion 24 is also formed in the focus ring 20. The inner diameter of the hollow portion 24 is substantially the same as the outer diameter of the outer peripheral surface 14 of the focus cam 10, and is a size that allows the outer peripheral surface 14 of the focus cam 10 to pass through the inside of the focus ring 20. A stepped portion 22, which protrudes outward and includes grooves formed on the surface thereof, is formed in the circumferential direction at a front end portion of the focus ring 20.

Figure 4:
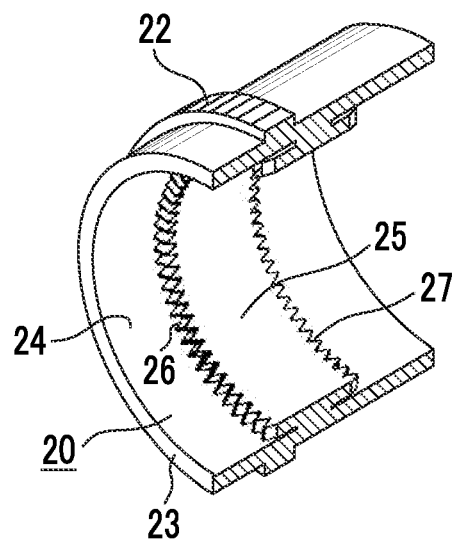
FIG. 4 is a cross-sectional view in which a part of a focus ring is cut out.

FIG. 4 is a perspective view in which a part of the focus ring 20 is cut out.

A stepped portion 25, which protrudes inward along the circumferential direction, is formed on the inner surface of the focus ring 20. A gear (second operation ring gear) 26 and a gear (first operation ring gear) 27 are formed on the front end side and the rear end side of the stepped portion 25, respectively.

Referring to FIGS. 1 to 3 again, a fixing member 30 is mounted on the barrel body 2 at a rear end portion of the imaging lens barrel 1. The fixing member 30 is mounted on the rear end portion of the barrel body 2, so that the barrel is formed. The fixing member 30 is also formed in the shape of a circular pipe. A gear (barrel gear) 32 is formed on a front end face of the fixing member 30. A hollow portion 33 is also formed in the fixing member 30. The inner diameter of the hollow portion 33 is substantially the same as the outer diameter of the outer peripheral surface 14 of the focus cam 10, and the outer peripheral surface 14 of the focus cam 10 passes through the hollow portion 33 of the fixing member 30.

The focus ring 20 is rotatably mounted on the outer peripheral surface of the focus cam 10. A distance between front and rear end faces of the focus ring 20 is shorter than a distance between the gear 17, which is formed on the stepped portion of the focus cam 10, and the pinion 15. Accordingly, the focus ring 20 can be moved along the outer peripheral surface 14 of the focus cam 10 in the direction of the optical axis L.

The barrel body 2 rotatably passes through the hollow portion 13 of the focus cam 10. Since the barrel body 2 passes through the inside of the focus cam 20, a rear end face 4 of the stepped portion 3 formed at the front end portion of the barrel body 2 comes into contact with a front end face 12 of the focus cam 10. Further, while the focus cam 10 rotatably passes through the barrel body 2, the fixing member 30 is fixed to the stepped portion 7 formed at the rear end portion of the barrel body 2 (barrel). Accordingly, the gear 32 formed on the front end face of the fixing member 30 meshes with the teeth of the pinions 15 that are mounted on the focus cam 10.

Figure 5:
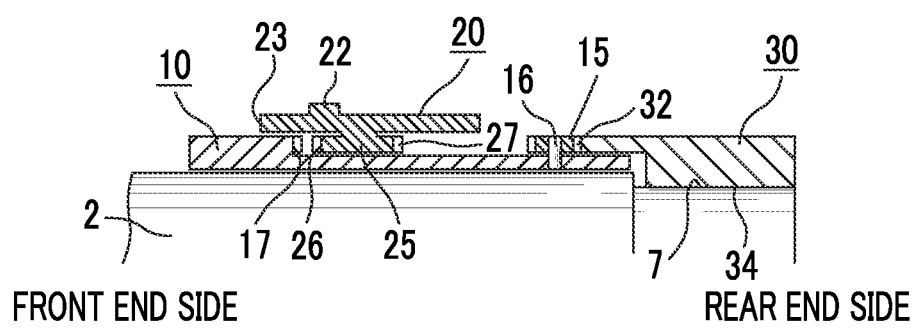
FIG. 5 is a cross-sectional view of a part of the imaging lens barrel.

FIG. 5 is a cross-sectional view of a part of the imaging lens barrel 1.

As described above, the focus ring 20 can be moved along the outer peripheral surface 14 of the focus cam 10 in the direction of the optical axis L. FIG. 5 shows an aspect in which the focus ring 20 is positioned slightly close to the front end side but still can be moved to the front end side. In such a case, the gear 26 (see FIG. 4) of the stepped portion 25 formed on the inner surface of the focus ring 20 does not mesh with the gear 17 formed on the focus cam 10 and the gear 27 (see FIG. 4) of the stepped portion 25 formed on the inner surface of the focus ring 20 also does not mesh with the pinions 15 of the focus cam 10. Even though the focus ring 20 is rotated, the torque of the focus ring 20 is not transmitted to the focus cam 10. However, a state in which the gear 26 of the stepped portion 25 of the focus ring 20 does not mesh with the gear 17 of the focus cam 10 and the gear 27 of the stepped portion 25 of the focus ring 20 does not mesh with the pinions 15 of the focus cam 10 as shown in FIG. 5 may not necessarily occur.

Figure 6:
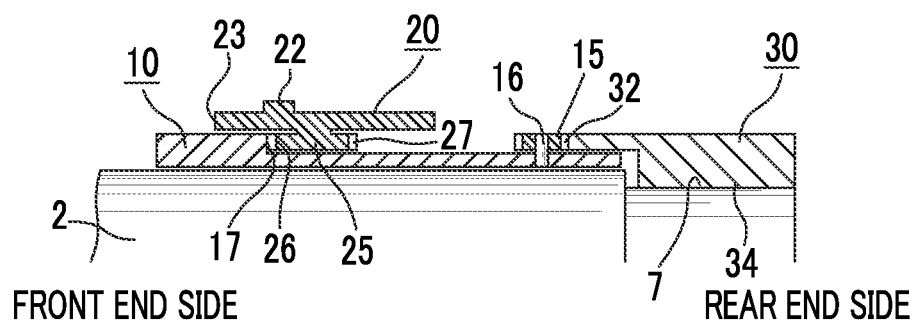
FIG. 6 is a cross-sectional view of a part of the imaging lens barrel.

FIG. 6 is also a cross-sectional view of a part of the imaging lens barrel 1.

FIG. 6 shows an aspect in which the focus ring 20 has been moved to the front end portion. When the focus ring 20 is moved to the front end side, the gear 26 (see FIG. 4) formed on the front end side of the stepped portion 25 formed on the inner surface of the focus ring 20 meshes with the gear 17 formed on the focus cam 10. When the focus ring 20 is rotated, the torque of the focus ring 20 is directly transmitted to the focus cam 10.

Figure 7:
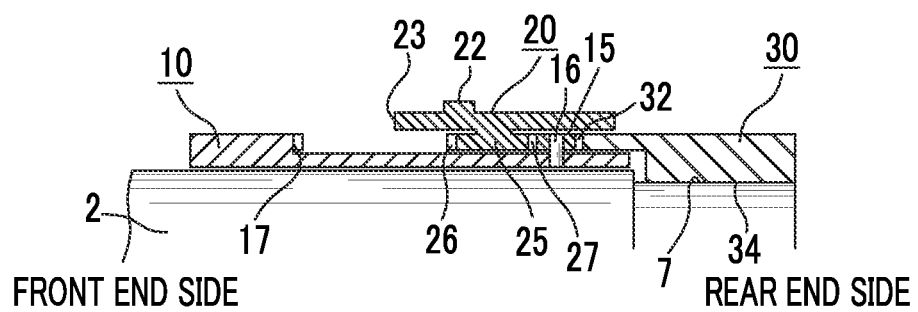
FIG. 7 is a cross-sectional view of a part of the imaging lens barrel.

FIG. 7 is also a cross-sectional view of a part of the imaging lens barrel 1.

FIG. 7 shows an aspect in which the focus ring has been moved to the front end portion. When the focus ring 20 is moved to the rear end side, the gear 27 (see FIG. 4) formed on the rear end side of the stepped portion 25 formed on the inner surface of the focus ring 20 meshes with the teeth of the pinions 15 mounted on the focus cam 10.

Figure 8:
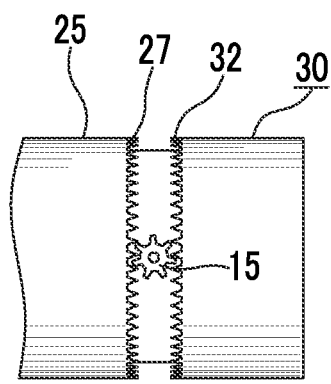
FIG. 8 shows a positional relationship among the focus ring, a pinion, and a fixing member.

FIG. 8 is a plan view showing an aspect in which the gear 27 meshes with the pinion 15.

As described above, the pinions 15 are rotatable about the shafts 16. When the focus ring 20 is rotated, the pinions 15 are rotated and a half of the rotation angle of the focus ring 20 is the same as the rotation angle of the focus cam 10.

Even though the rotation angle of the focus ring 20 is the same when the focus ring 20 is moved to the front end side and when the focus ring 20 is moved to the rear end side as described above, it is possible to reduce the rotation angle of the focus cam 10 by half. For example, when the actuation angle of the focus cam 10 is 150° and the focus ring 20 is positioned at the front end side, it is possible to rotate the focus cam 10 by an angle of 150° by rotating the focus ring 20 by an angle of 150°. However, when the focus ring 20 is positioned at the rear end side, the focus cam 10 cannot be rotated by an angle of 150° unless the focus ring 20 is rotated by an angle of 300°.

Cam grooves (not shown) are formed at the focus cam 10, and slide grooves (not shown) are also formed along the direction of the optical axis L on the outer peripheral surface 6 of the barrel body 2. Accordingly, when the focus cam 10 is rotated, a focus lens (not shown) held in the barrel body 2 is moved in the direction of the optical axis.

In this embodiment, it is possible to make the rotation angle of the focus cam 10 be half of the rotation angle of the focus ring 20 even though the rotation angle of the focus ring 20 is the same when the focus ring 20 is moved to the front end side and when the focus ring 20 is moved to the rear end side. Accordingly, even though the rotation angle of the focus ring 20 is the same when the focus ring 20 is moved to the front end side and is rotated and when the focus ring 20 is moved to the rear end side and is rotated, it is possible to reduce the movement distance of the focus lens by half.

The focus lens has been described in the above-mentioned embodiment, but it goes without saying that the same structure as described above can also be applied to the zoom lens and the iris.

Figure 9:
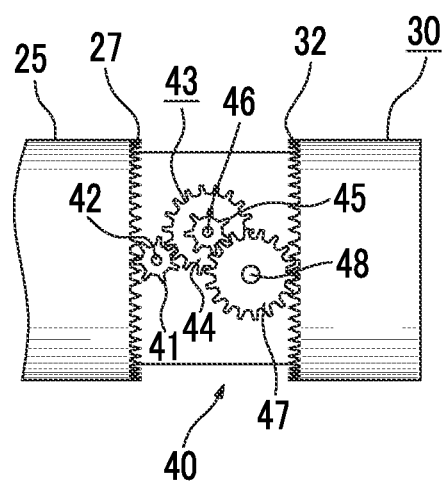
FIG. 9 shows a positional relationship among the focus ring, a pinion group, and the fixing member.

FIG. 9 shows a modification.

FIG. 9 shows a pinion group 40 that is rotatably mounted on a focus cam 10. FIG. 9 corresponds to FIG. 8.

In the modification illustrated in FIG. 9, a plurality of pinion groups 40 including a plurality of pinions (first gears) 41, pinions (third gears) 43, and pinions (second gears) 47 are mounted on the focus cam 10.

A gear 27 of a stepped portion 25 formed on the inner surface of a focus ring 20 meshes with the teeth of the pinion 41 that is rotated about a shaft 42. The pinion 41 meshes with a first pinion 44 of first and second pinions 44 and 45 that are rotated about a shaft 46, have different gear ratios, and are rotated simultaneously. The second pinion 45 meshes with a pinion 47 that is rotated about a shaft 48. The pinion 47 meshes with a gear 32 of a fixing member 30.

When the focus ring 20 is rotated, the torque of the focus ring 20 is transmitted to the focus cam 10 through the pinion groups 40. Since a ratio of the rotation angle of the focus ring 20 to the rotation angle of the focus cam 10 depends on the gear ratio of the pinion group 40, it is possible to make the ratio of the rotation angle of the focus ring 20 to the rotation angle of the focus cam 10 be a desired ratio.

What is claimed is:

1. An imaging lens barrel comprising:
    a barrel in which an optical element is held and a barrel gear is formed along a peripheral surface toward the other end portion at one end portion in a direction of an optical axis;
    a cylindrical cam ring which is rotatable along an outer peripheral surface of the barrel, adjusts the optical element held in the barrel by rotating, and is provided with a rotatable gear including a shaft provided parallel to a radial direction at one end portion in the direction of the optical axis and meshing with the barrel gear formed on the barrel, and in which a cam gear facing one end portion is formed along a circumferential direction at the other end portion in the direction of the optical axis; and
    a cylindrical operation ring that is rotatable along an outer peripheral surface of the cam ring and is movable in the direction of the optical axis and in which a first operation ring gear meshing with the gear of the cam ring is formed at one end portion in the direction of the optical axis and a second operation ring gear meshing with the cam gear of the cam ring is formed at the other end portion in the direction of the optical axis.

2. The imaging lens barrel according to claim 1,
    wherein the gear of the cam ring is a gear group that is formed of a combination of a plurality of gears of which the number is an odd number, and
    the gear group includes a first gear that meshes with the operation ring gears of the operation ring, a second gear that meshes with the barrel gear of the barrel, and third gears that are formed of one or a plurality of gears of which the number is an odd number and which change a speed ratio between the first and second gears and mesh with the first and second gears.

3. The imaging lens barrel according to claim 1,
    wherein the barrel gear formed on the barrel is formed at the other end portion of a cylindrical fixing member, which is fixed to an outer peripheral surface of one end portion of the barrel, in the direction of the optical axis.

4. The imaging lens barrel according to claim 2,
    wherein the barrel gear formed on the barrel is formed at the other end portion of a cylindrical fixing member, which is fixed to an outer peripheral surface of one end portion of the band, in the direction of the optical axis.

* * * * *